United States Patent [19]
Collier, IV et al.

[11] Patent Number: 5,288,791
[45] Date of Patent: Feb. 22, 1994

[54] LOW STRESS RELAXATION ELASTOMERIC FIBERS

[75] Inventors: L. Warren Collier, IV, Alpharetta; Steven R. Stopper, Doraville, both of Ga.

[73] Assignee: Kimberly-Clark Corporation, Neenah, Wis.

[21] Appl. No.: 43,887

[22] Filed: Apr. 7, 1993

Related U.S. Application Data

[62] Division of Ser. No. 463,079, Jan. 10, 1990, Pat. No. 5,260,126.

[51] Int. Cl.$^5$ ............................................. C08L 53/00
[52] U.S. Cl. ........................................ 524/505; 428/224; 428/903; 525/89; 525/92
[58] Field of Search ............... 524/505; 525/89, 92; 428/224, 903

[56] References Cited

U.S. PATENT DOCUMENTS

| | | | |
|---|---|---|---|
| Re. 32,634 | 3/1988 | Chmiel et al. | 524/432 |
| 3,507,934 | 4/1970 | Minor et al. | 260/376 |
| 3,562,204 | 2/1971 | Van Breen | 260/41.5 |
| 3,595,942 | 7/1971 | Wald et al. | 260/41.5 |
| 3,614,836 | 10/1971 | Snyder et al. | 36/2.5 |
| 3,880,976 | 4/1975 | Sumoto et al. | 264/210 F |
| 4,078,131 | 3/1978 | de Zaraux | 526/20 |
| 4,166,464 | 9/1979 | Korpman | 128/287 |
| 4,197,377 | 4/1980 | Bohm et al. | 525/99 |
| 4,209,563 | 6/1980 | Sisson | 428/288 |
| 4,250,273 | 2/1981 | Bohm et al. | 525/99 |
| 4,259,540 | 3/1981 | Sabia | 174/23 C |
| 4,267,096 | 5/1981 | Bussink et al. | 260/40 R |
| 4,305,990 | 12/1981 | Kelly | 428/220 |
| 4,324,245 | 4/1982 | Mesek et al. | 128/287 |
| 4,340,684 | 7/1982 | Bohm et al. | 525/194 |
| 4,340,704 | 7/1982 | Borghi et al. | 526/125 |
| 4,350,795 | 9/1982 | Bohm et al. | 525/194 |
| 4,361,507 | 11/1982 | Bourland | 523/173 |
| 4,369,284 | 1/1983 | Chen | 524/476 |
| 4,418,123 | 11/1983 | Bunnelle et al. | 428/517 |
| 4,446,189 | 5/1984 | Romanek | 528/152 |
| 4,622,357 | 11/1986 | Tsuchida et al. | 524/270 |
| 4,692,371 | 9/1987 | Morman et al. | 428/224 |
| 4,716,183 | 12/1987 | Gamarra et al. | 522/80 |
| 4,720,415 | 1/1988 | VanderWielen et al. | 428/152 |
| 4,728,461 | 3/1988 | Fujii et al. | 252/511 |
| 4,745,139 | 5/1988 | Haasl et al. | 523/149 |
| 4,745,149 | 5/1988 | Eisele et al. | 524/505 |
| 4,777,080 | 10/1988 | Harris, Jr. et al. | 428/212 |
| 4,781,966 | 11/1988 | Taylor | 428/152 |
| 4,789,699 | 12/1988 | Kieffer et al. | 524/271 |
| 4,822,653 | 4/1989 | Kauffman et al. | 428/34.2 |
| 4,847,134 | 7/1989 | Fahrenkrug et al. | 428/138 |
| 4,892,903 | 1/1990 | Himes | 524/488 |
| 4,914,155 | 4/1990 | Shimomura et al. | 525/89 |
| 5,093,422 | 3/1992 | Hines | 525/89 |
| 5,169,706 | 12/1992 | Collier et al. | 428/152 |

FOREIGN PATENT DOCUMENTS

| | | |
|---|---|---|
| 211466 | 2/1987 | European Pat. Off. |
| 304124 | 2/1989 | European Pat. Off. |
| WO90/09770 | 2/1990 | PCT Int'l Appl. |

OTHER PUBLICATIONS

Shell Technical Bulletin, "Shell's KRATON ®G Thermoplastic Rubber", May 1973.

Primary Examiner—James J. Bell
Attorney, Agent, or Firm—Karl V. Sidor; James B. Robinson

[57] ABSTRACT

An elastic nonwoven web is formed from elastic fibers composed of a blend of (1) a styrene-poly(ethylene-propylene)-styrene thermoplastic elastomeric block copolymer or a mixture of a styrene-poly(ethylene-propylene)-styrene elastomeric block copolymer and a styrene-poly(ethylene-butylene)-styrene elastomeric block copolymer, and (2) a tackifying resin in which the elastic nonwoven web has a stress relaxation of less than about 30 percent. The blend used to form the elastic nonwoven web and/or elastic fibers may also include a polyolefin and an extending oil.

17 Claims, 7 Drawing Sheets

LOW STRESS RELAXATION ELASTOMERIC FIBERS

This application is a divisional application of application Ser. No. 07/463,079 filed on Jan. 10, 1990, now U.S. Pat. No. 5,260,126.

FIELD OF THE INVENTION

The present invention is generally directed to nonwoven webs and, in particular, to nonwoven elastic webs of fibers.

BACKGROUND OF THE INVENTION

In the field of nonwoven materials, there has been a continuing need for materials having high degree of flexibility and elasticity and which may be manufactured at a low cost. In particular, there is a need for an elastic material having a low initial load tension, low stress relaxation, low hysteresis and high recoverable energy. This need has persisted in spite of the fact that such materials could readily be utilized in the manufacture of a wide variety of garments of both the disposable type, such as disposable diapers, or the durable type, such as pants, dresses, blouses and sporting wear, for example, sweatsuits. Further, such materials could also be utilized in, for example, upholstery, drapery, linear and insulation applications. The traits of low initial load tension, low stress relaxation, low hysteresis and high recoverable energy are particularly desirable characteristics for materials used in these areas because articles manufactured from such materials may be easily put on the body of the wearer or any item, such as a fixed frame, around which the materials may be wrapped. Those traits are also very useful because articles manufactured from such materials are able to closely conform to the body of a wearer or any item and repeatedly extend and retract without sagging.

Elastic nonwoven webs of fibers have been formed from blends of styrene-poly(ethylene-butylene)-styrene elastomeric block copolymers with other materials such as, for example, polyolefins and tackifying resins to improve processing and/or bonding. While improving the processing and/or bonding properties of the elastic webs, such additives may, in certain situations, have an adverse affect on the elastic properties of the material. For example, elastic block copolymers blended with large amounts of a polyolefin and/or hydrocarbon resin may have poor stress relaxation properties and stress-strain tests of such materials show significant hysteresis.

DEFINITIONS

The term "elastic" is used herein to mean any material which, upon application of a biasing force that is, elongatable, to a stretched, biased length which is at least about 160 percent of its relaxed unbiased length, and which, will recover at least 55 percent of its elongation upon release of the stretching, elongating force. A hypothetical example would be a one (1) inch sample of a material which is elongatable to at least 1.60 inches and which, upon being elongated to 1.60 inches and released, will recover to a length of not more than 1.27 inches. Many elastic materials may be elongated by much more than 60 percent (i.e., much more than 160 percent of their relaxed length), for example, elongated 100 percent or more, and many of these will recover to substantially their initial relaxed length, for example, to within 105 percent of their initial relaxed length, upon release of the stretching force.

As used herein, the term "nonelastic" refers to any material which does not fall within the definition of "elastic," above.

As used herein, the terms "recover" and "recovery" refer to a contraction of a stretched material upon termination of a biasing force following stretching of the material by application of the biasing force. For example, if a material having a relaxed, unbiased length of one (1) inch is elongated 50 percent by stretching to a length of one and one half (1.5) inches the material would be elongated 50 percent (0.5 inch) and would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its one-half (0.5) inch elongation. Recovery may be expressed as [(maximum stretch length—final sample length)/(maximum stretch length—initial sample length)] × 100.

As used herein, the term "nonwoven web" means a web having a structure of individual fibers or threads which are interlaid, but not in an identifiable, repeating manner. Nonwoven webs have been, in the past, formed by a variety of processes such as, for example, meltblowing processes, spunbonding processes and bonded carded web processes.

As used herein, the term "microfibers" means small diameter fibers having an average diameter not greater than about 100 microns, for example, having an average diameter of from about 0.5 microns to about 50 microns, or more particularly, microfibers may have an average diameter of from about 4 microns to about 40 microns.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, the disclosure of which is hereby incorporated by reference.

As used herein, the term "spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawing or other well-known spun-bonding mechanisms. The production of spunbonded nonwoven webs is illustrated in patents such as, for example, in U.S. Pat. No. 4,340,563 to Appel et al., and U.S. Pat. No. 3,692,618 to Dorschner et al. The disclosures of these patents are hereby incorporated by reference.

As used herein, the term "stress relaxation" refers to the loss of tension or load measured after a sample of an elastic material has been elongated at a specified rate of extension to a predetermined length and held at that length for a specified period of time, for example, from about 1 minute to about 30 minutes. Except where otherwise noted for the present invention, stress relaxation is expressed as a percentage loss of the initial load encountered at a specified extension of an elastic material. The stress relaxation is determined by calculating the difference between the initial load measured after elongating an elastic material at a rate of 20 inches per minute to an elongation of 300% (i.e., to 400 percent or the material's initial length) and the remaining load measured after that sample was held at that length for 20 minutes divided by the initial load at that length. Testing may be performed on an Instron Model 1122 Universal Test Machine using a 100 mm by 3 inch sample attached to jaw faces that have a width of 3 inches and a height of 1 inch. Stress relaxation after 20 minutes at, for example, an elongation of 300% (i.e., to 400% of the material s initial length—from 100 mm to 400 mm) may be expressed as a percentage utilizing the following equation:

$$\text{stress relaxation} = (peak\ load_{300\%} \text{-} peak\ load_{300\%} @ 20\ min)/(peak\ load_{300\%})*100$$

As used herein, the term "average molecular weight" refers to the number average molecular weight of a polymer or polymer fragment as determined by gel permeation chromatography. Molecular weight information for the styrene-poly(ethylene-propylene)-styrene elastomeric block copolymers and the styrene-poly(ethylene-butylene)-styrene elastomeric block copolymers was obtained from the Shell Chemical Company.

As used herein, the term "melt flow rate" refers to the amount of material under a pressure or load that flows through an orifice at a given temperature over a measured period of time. The melt flow rate is expressed in units of weight divided by time (i.e., grams/10 minutes). The melt flow rate was determined by measuring the weight of a polymer under a 2.160 kg load that flowed through an orifice diameter of 2.0995±0.0051 mm during a measured time period such as, for example, 10 minutes at a specified temperature such as, for example, 190° C. as determined in accordance with ASTM Test Method D1238-82, "Standard Test Method for Flow Rates of Thermoplastic By Extrusion Plastometer," using a Model VE 4-78 Extrusion Plastometer (Tinius Olsen Testing Machine Co., Willow Grove, Pa.).

As used herein, the term "superabsorbent" refers to absorbent materials capable of absorbing at least 10 grams of aqueous liquid (e.g. distilled water) per gram of absorbent material while immersed in the liquid for 4 hours and holding substantially all of the absorbed liquid while under a compression force of up to about 1.5 psi.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates and materials added to enhance processability of the composition.

As used herein, the term "compatible" refers to the relationship of one polymeric material to another with respect to the extrusion process and extrudates. To be compatible, two different polymeric materials should, for example, be capable of blending into a substantially homogeneous miscible mixture.

SUMMARY OF THE INVENTION

The present invention addresses problems of the prior art by providing an elastic nonwoven web of fibers formed from a blend including: (1) a styrene-poly(ethylene-propylene)-styrene elastomeric block copolymer or a mixture of styrene-poly(ethylene-propylene)-styrene and styrene-poly(ethylene-butylene)-styrene elastomeric block copolymers; and (2) a tackifying resin, in which the nonwoven elastic web has a stress relaxation of less than about 30 percent. The styrene-poly(ethylene-propylene)-styrene thermoplastic elastomeric block copolymer component of the blend used to form the elastic web has a general formula of:

wherein m is an integer of at least about 38, for example, from about 38 to about 337; and n is an integer of at least about 500, for example, from about 500 to about 1,860; and R is a benzyl group. The elastomeric block copolymer typically has an average molecular weight ranging from about 50,000 to about 90,000 and an average molecular weight ratio of polystyrene endblocks to poly(ethylene-propylene) midblocks ranging from about 10:90 to about 25:75. For example, one particularly useful elastomeric block copolymer has an average molecular weight of about 62,000 with polystyrene endblocks each having an average molecular weight of about 6,200 and an average molecular weight ratio of polystyrene endblocks to poly(ethylene-propylene) midblocks of about 21.7:78.3.

In some situations, it may be desirable to blend the styrene-poly(ethylene-propylene)-styrene elastomeric block copolymer with another elastomeric block copolymer such as, for example, a styrene-poly(ethylene-butylene)-styrene block copolymer to form an elastomeric block copolymer mixture. Such a mixture may be used in place of a substantially pure styrene-poly(ethylene-propylene)-styrene elastomeric block copolymer and still achieve the desired stress-relaxation properties.

The tackifying resin component of the blend may be for example, hydrogenated hydrocarbon resins and/or terpene hydrocarbon resins. The blend may also contain a polyolefin and/or an extending oil. The polyolefin component of the blend may be selected from, for example, polyethylene, polypropylene, polybutylene, polyethylene copolymers, polypropylene copolymers, polybutylene copolymers and mixtures thereof. The extending oil may be a mineral oil such as, for example, a white mineral oil.

The blend may contain from about 50 to about 80 percent, by weight, of the styrene-poly(ethylene-propylene)-styrene elastomeric block copolymer or mixture of styrene-poly(ethylene-propylene)-styreneandstyrene-poly(ethylene-butylene)-styrene elastomeric block copolymers, from about 15 to about 28 percent by weight of the tackifying resin, from about 3 to about 23 percent by weight of the polyolefin, and from about 0 to about 15 percent by weight of the extending oil.

The elastic nonwoven web of fibers may be a web of meltblown fibers or spunbonded fibers. The meltblown fibers may be microfibers. The elastic nonwoven web may also include at least one type of nonelastic fibers and/or particulate materials, for example nonelastic microfibers, which are distributed within or upon the matrix. The nonelastic fibers may be generally uniformly distributed throughout the matrix. Random and gradient distributions are also envisioned.

The nonelastic fibers, which may be microfibers, may be selected from the group including polyester fibers, polyamide fibers, glass fibers, polyolefin fibers, cellulosic derived fibers, multi-component fibers, natural fibers or electrically conductive fibers or blends of two or more nonelastic fibers. If the nonelastic fibers are natural fibers, the natural fibers may be selected from, for example, cotton fibers, wool fibers and silk fibers. If the nonelastic fibers are polyolefin fibers, the polyolefin fibers may be selected from, for example, polyethylene fibers or polypropylene fibers. If the nonelastic fibers are cellulosic derived fibers, the cellulosic derived fibers may be selected from, for example, rayon fibers or wood fibers. Exemplary wood fibers are wood pulp fibers. If the nonelastic fibers are polyamide fibers, the polyamide fibers may be nylon fibers. If the nonelastic fibers are multi-component fibers, the multi-component fibers may be sheath-core fibers or side-by-side fibers. The nonelastic fibers may be absorbent or superabsorbent fibers.

If nonelastic fibers are present in the elastic nonwoven web, the elastic nonwoven web may generally include from about 20 percent, by weight, to about 99 percent, by weight, of fibers formed from the styrene-poly(ethylene-propylene)-styrene blend and from about 1 percent, by weight to 80 percent, by weight, of the nonelastic fibers. For example, the elastic nonwoven web may include from about 50 percent, by weight to about 99 percent, by weight, of fibers formed from the styrene-poly(ethylene-propylene)-styrene blend and from about 1 percent, by weight, to about 50 percent, by weight, of the nonelastic fibers. In certain applications, particulate materials may be substituted for the nonelastic fibers. Alternatively, the elastic nonwoven web may have both nonelastic fibers and particulate materials incorporated into the matrix styrene-poly(ethylene-propylene)-styrene fibers. In such a three component system, the elastic nonwoven web may contain from about 50 percent, by weight, to about 98 percent, by weight, of the styrene-poly(ethylene-propylene)-styrene blend fibers, from about 1 percent, by weight, to about 49 percent, by weight, of nonelastic fibers and from about 1 percent, by weight, to about 49 percent, by weight, of particulate materials. Exemplary particulate materials are activated charcoal and superabsorbent materials such as, for example, hydrocolloids.

DETAILED DESCRIPTION OF THE INVENTION

The elastic nonwoven web (e.g., a film, porous film or fibrous nonwoven web) may be formed by a variety of extrusion techniques. One particularly useful extrusion technique is to form a fibrous elastic nonwoven web by meltblowing.

Figure 1:
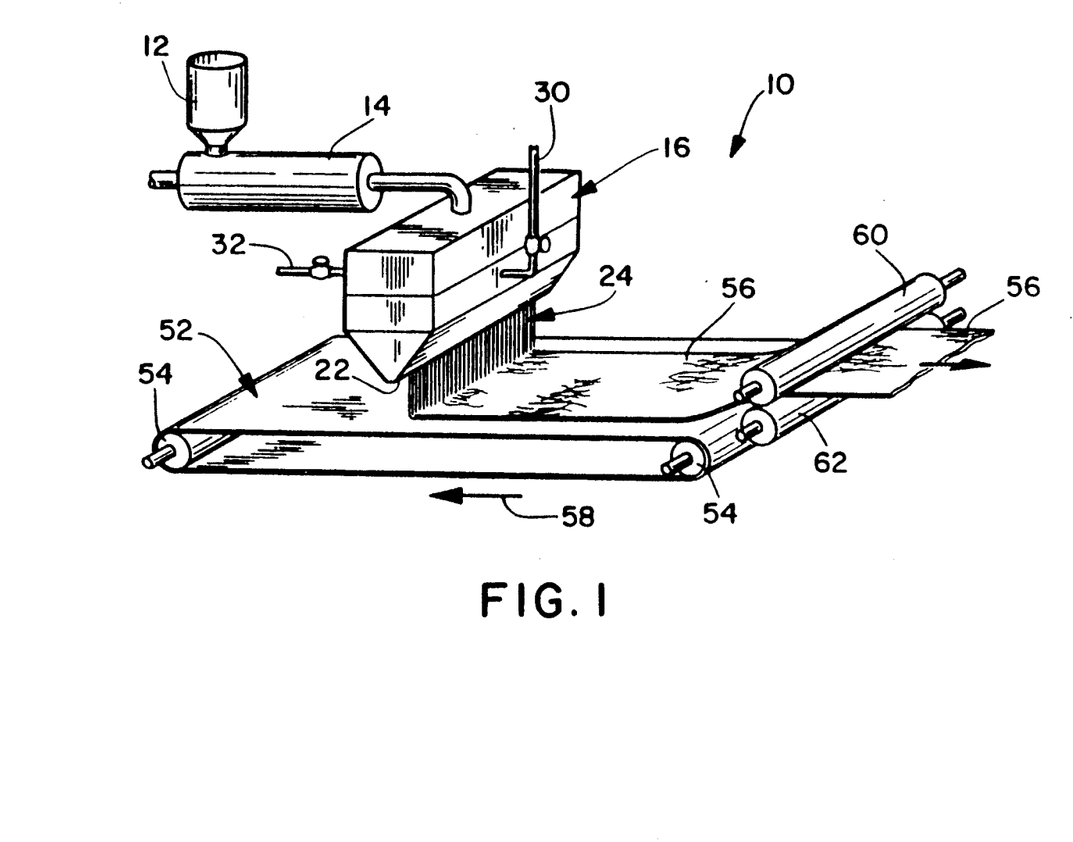
FIG. 1 is a schematic illustration of an apparatus, including a meltblowing die, which may be utilized to form the elastic nonwoven web of the present invention.

Turning now to the FIGURES and, in particular, to FIG. 1, wherein like reference numerals represent the same or equivalent structure, it can be seen that an apparatus for forming the elastic nonwoven web of the present invention is schematically generally represented by reference numeral 10. In forming the elastic nonwoven web of the present invention pellets or chips, etc.(-not shown) of a blend material are introduced into a pellet hopper 12 of an extruder 14.

The elastic nonwoven web of fibers of the present invention is formed from (1) a blend of an elastic styrene-poly(ethylene-propylene)-styrene (SEPS) block copolymer or a mixture of styrene-poly(ethylene-propylene)-styrene and styrene-poly(ethylene-butylene)-styrene elastomeric block copolymers and (2) a tackifying resin. The blend may further include a polyolefin and an extending oil. The styrene-poly(ethylene-propylene)-styrene thermoplastic elastomeric block copolymer component has a general formula of:

wherein m has a value of at least about 38, for example, from about 38 to about 337; and n has a value of at least about 500, for example, from about 500 to about 1,860; and R is a benzyl group. Particularly useful values for m range from about 48 to about 87 resulting in a polystyrene endblock having an average molecular weight from about 5,000 to about 10,000. Particularly useful values for n range from about 570 to about 1,000 resulting in a poly(ethylene-propylene) midblock having an average molecular weight from about 40,000 to about 70,000. The total molecular weight of the polymer may be, for example, from about 50,000 to about 90,000. Such rubbery block copolymers may have an average molecular weight ratio of polystyrene endblocks to poly(ethylene-propylene) midblocks from about 10:90 to about 25:75. For example, one styrene-poly(ethylene-propylene)-styrene (SEPS)elastomeric block copolymer useful in the present invention is available from the Shell Chemical Company and has an average molecular weight of about 62,000 with polystyrene endblocks each having an average molecular weight of about 6,200 and an average molecular weight ratio of polystyrene endblocks to poly(ethylene-propylene) midblocks of about 21.7:78.3. Exemplary properties of that SEPS polymer are given in Table 1.

TABLE 1

STYRENE-POLY(ETHYLENE-PROPYLENE)-STYRENE
(SEPS) BLOCK COPOLYMER
Physical Properties

| | |
|---|---|
| Tensile Strength[1], psi | 2260 |
| 300% Modulus[1], psi | 740 |
| Elongation at Break[1], % | 550 |
| Stress Relaxation[2], % | 23 |
| Hysteresis Properties[3]: | |
| Recoverable Energy[4], % | 77 |
| Set[5], % | 9 |

[1]Determined in accordance with ASTM D-412 using 3 mm wide (approximately 0.1 inch) and 0.020 inches thick dumbbell samples that are cut from films cast from toluene solution.
[2]Sample was elongated at 20 inches/minute to 160 percent elongation and held at 160 percent elongation for 30 minutes. Stress relaxation is the ratio determined by dividing the load after 30 minutes at 160 percent elongation by the peak load at 160 percent elongation and multiplying by 100.
[3]Determined by elongating the sample at 1 inch/minute to 150 percent elongation and cycling back to zero load for 1 hysteresis loop.
[4]Determined by dividing the area under the retraction curve of the first hysteresis loop by the area under the elongation curve of the first hysteresis loop and then multiplying by 100.
[5]Determined by dividing the zero load extension after 1 cycle by the initial sample gauge length and then multiplying by 100. The zero load extension is the distance that the jaws of the tensile test equipment move at the beginning of the second cycle before a load is registered by the tensile test equipment.

In some situations, it may be desirable to blend the styrene-poly(ethylene-propylene)-styrene elastomeric block copolymer with another elastomeric block copolymer such as, for example, a styrene-poly(ethylene-butylene)-styrene block copolymer to form an elastomeric block copolymer mixture. Such a mixture may be used in the present invention in place of a substantially pure styrene-poly(ethylene-propylene)-styrene elastomeric block copolymer and still achieve the desired stress-relaxation properties. Useful elastomeric block copolymer mixtures may contain up to about 60 parts by weight of styrene-poly(ethylene-butylene)-styrene elastomeric block copolymer per 100 parts of elastomeric block copolymer and down to about 40 parts by weight of styrene-poly(ethylene-propylene)-styrene elastomeric block copolymer per 100 parts of elastomeric block copolymer. One useful styrene-poly(ethylene-butylene)-styrene elastomeric block copolymer has an average molecular weight of about 50,000 with polystyrene endblocks having an average molecular weight of about 7,200 and an average molecular weight ratio of polystyrene endblocks to poly(ethylene-butylene) midblocks of about 30:70. Such a styrene-poly(ethylene-butylene)-styrene block copolymer may be obtained from the Shell Chemical Company under the trade designation KRATON® G-1652.

Various tackifying resins may be used in the present invention. In particular, the purpose of the tackifying resin is to provide an elastic web that can act as a pressure sensitive adhesive, e.g., to bond the elastic sheet to a gatherable web. Of course, various tackifying resins are known, and are discussed, e.g., in U.S. Pat. Nos. 4,789,699, 4,294,936 and 3,783,072, the contents of which, with respect to the tackifier resins, are incorporated herein by reference. Any tackifier resin can be used which is compatible with the elastic polymer and the polyolefin, and can withstand the high processing (e.g., extrusion) temperatures. Generally, hydrogenated hydrocarbon resins are preferred tackifying resins, because of their better temperature stability. In the following paragraphs are disclosed information on three specific tackifying resins, two of which (REGALREZ® and ARKON®P series tackifiers) are examples of hydrogenated hydrocarbon resins, and the ZONATAC®501 lite being a terpene hydrocarbon. Of course, while the three tackifying resins are specifically discussed, the present invention is not limited to use of such three tackifying resins, and other tackifying resins which are compatible with the other components of the composition and can withstand the high processing temperatures, and can achieve the objectives of the present invention, can also be used.

REGALREZ® hydrocarbon resins, a product of Hercules, Incorporated, are fully hydrogenated °-methyl styrene-type low molecular weight hydrocarbon resins, produced by polymerization and hydrogenation of pure monomer hydrocarbon feed stocks. Grades 1094, 3102, 6108 and 1126 are highly stable, light-colored low molecular weight, nonpolar resins suggested for use in plastics modification, adhesives, coatings, sealants and caulks. The resins are compatible with a wide variety of oils, waxes, alkyds, plastics and elastomers and are soluble in common organic solvents.

ZONATAC®501 lite resin, a product of Arizona Chemical Co., has a softening point of 105° C., a Gardner color 1963 (50% in heptane) of 1—and a Gardener color neat (pure) of 2+; a color (approximate Gardner color equal to 1—(50% in heptane); APHA color=70) of water white, a specific gravity (25°/25° C.) of 1.02 and a flash point (closed cup, ° F.) of 480° F.

The polyolefin which may be utilized in the extrudable composition must be one which, when blended with the elastic block copolymer or a mixture of elastomeric block copolymers and subjected to an appropriate combination of elevated pressure and elevated temperature conditions, is extrudable, in blended form, with the elastomeric block copolymer or mixture of elastomeric block copolymers. In particular, useful polyolefin materials include polyethylene, polypropylene and polybutylene, including polyethylene copolymers, polypropylene copolymers and polybutylene copolymers. Blends of two or more of the polyolefins may be utilized.

One particular polyethylene may be obtained from U.S.I. Chemical Company under the trade designation Petrothene NA 601 (also referred to herein as PE NA 601). Information obtained from U.S.I. Chemical Company states that PE NA 601 is a low molecular weight, low density polyethylene for application in the areas of hot melt adhesives and coatings. U.S.I. has also stated that PE NA 601 has the following nominal values: (1) a Brookfield viscosity, cP at 150 degrees Centigrade of 8,500 and at 190 degrees Centigrade of 3,300 when measured in accordance with ASTM D 3236; (2) a density of 0.903 grams per cubic centimeter when measured in accordance with ASTM D 1505; (3) an equivalent Melt index of 2,000 grams per 10 minutes when measured in accordance with ASTM D 1238; (4) a ring and ball softening point of 102 degrees Centigrade when measured in accordance with ASTM E 28; (5) a tensile strength of 850 pounds per square inch when measured in accordance with ASTM D 638; (6) an elongation of 90% when measured in accordance with ASTM D 638; (7) a modulus of rigidity, $T_f(45,000)$ of −34 degrees Centigrade; and (8) a penetration hardness (tenths of mm) at 77 degrees Fahrenheit of 3.6.

Of course, the present invention is not limited to use of such specific polyolefins described herein. In this regard, note the polyolefins as described in U.S. Pat. Nos. 4,663,220 and 4,789,699, the contents of which are incorporated herein by reference. More generally, and noting the specific purpose of the polyolefin, as described in the U.S. Pat. No. 4,663,220, various polyolefins which can be utilized in the present invention can easily be determined.

Extending oils which may be used in the blend should be capable of being melt-processed with the other components of the blend without degrading. An exemplary extending oil is a white mineral oil available under the trade designation Drakeol 34 from the Pennzoil Company. Drakeol 34 has a specific gravity of 0.864-0.878 at 60° F., a flash point 460° F. and viscosity of 370-420 SUS at 100° F. (other physical properties). Suitable vegetable oils, animal oils and their derivatives may also be used as the extending oil.

The components of the composition of the present invention can be utilized over broad ranges of the amounts of each component. As a guide, the best results have been obtained when utilizing a four-component blend of a styrene-poly(ethylene-propylene)-styrene (SEPS) elastomeric block copolymer or a mixture of styrene-poly(ethylene-propylene)-styrene (SEPS) and styrene-poly(ethylene-butylene)-styrene (SEBS) elastomeric block copolymers, a polyolefin, a tackifier and an extending oil. The following ranges, as shown in Table 2, are exemplary. It is emphasized that these ranges are merely illustrative, serving as a guide for amounts of the various components in the composition.

TABLE 2

|  | Weight % |
|---|---|
| SEPS elastomeric block copolymer or mixture of SEPS and SEBS elastomeric block copolymers | 50-80 |
| Tackifier | 15-28 |
| Polyolefin | 3-23 |
| Extending Oil | 0-15 |

Figure 2:
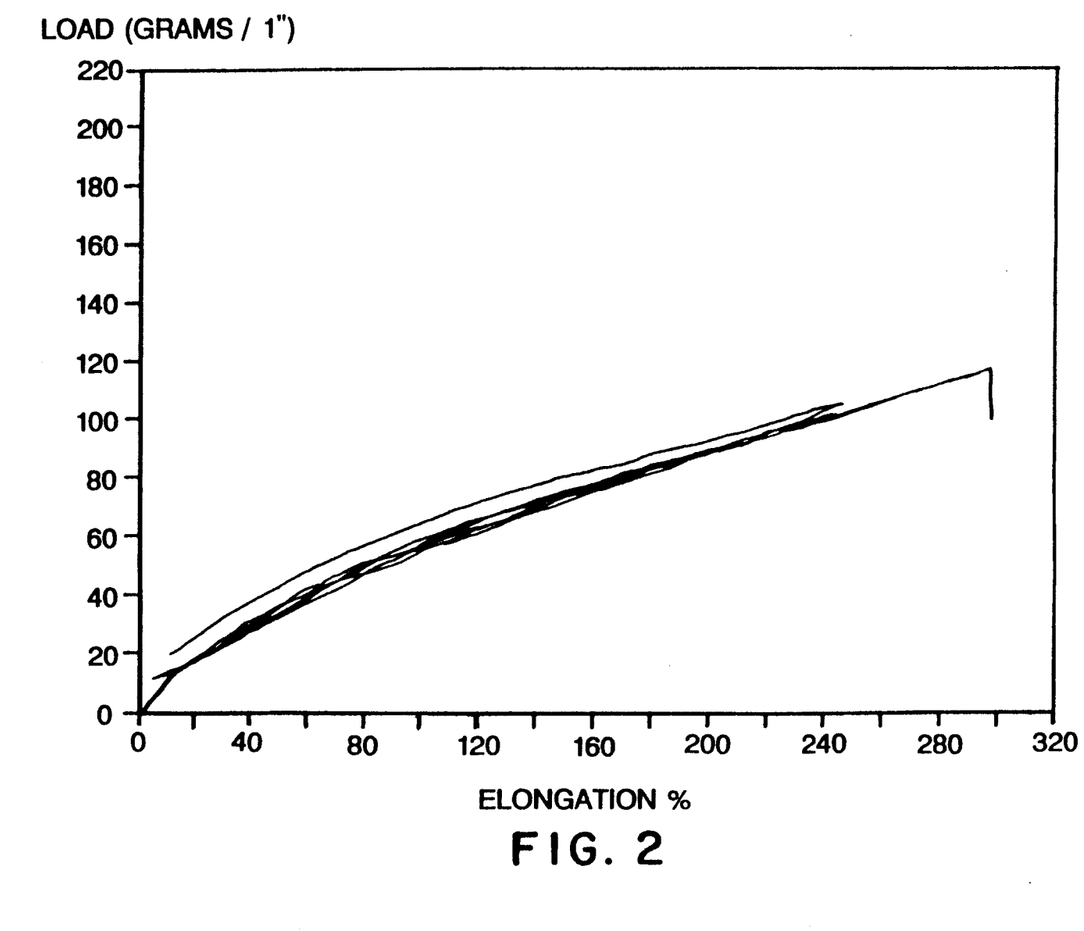
FIG. 2 is an exemplary stress-strain curve for an elastic nonwoven web of meltblown fibers formed from a styrene-poly(ethylene-propylene)-styrene thermoplastic elastomeric block copolymer blend.
Figure 3:
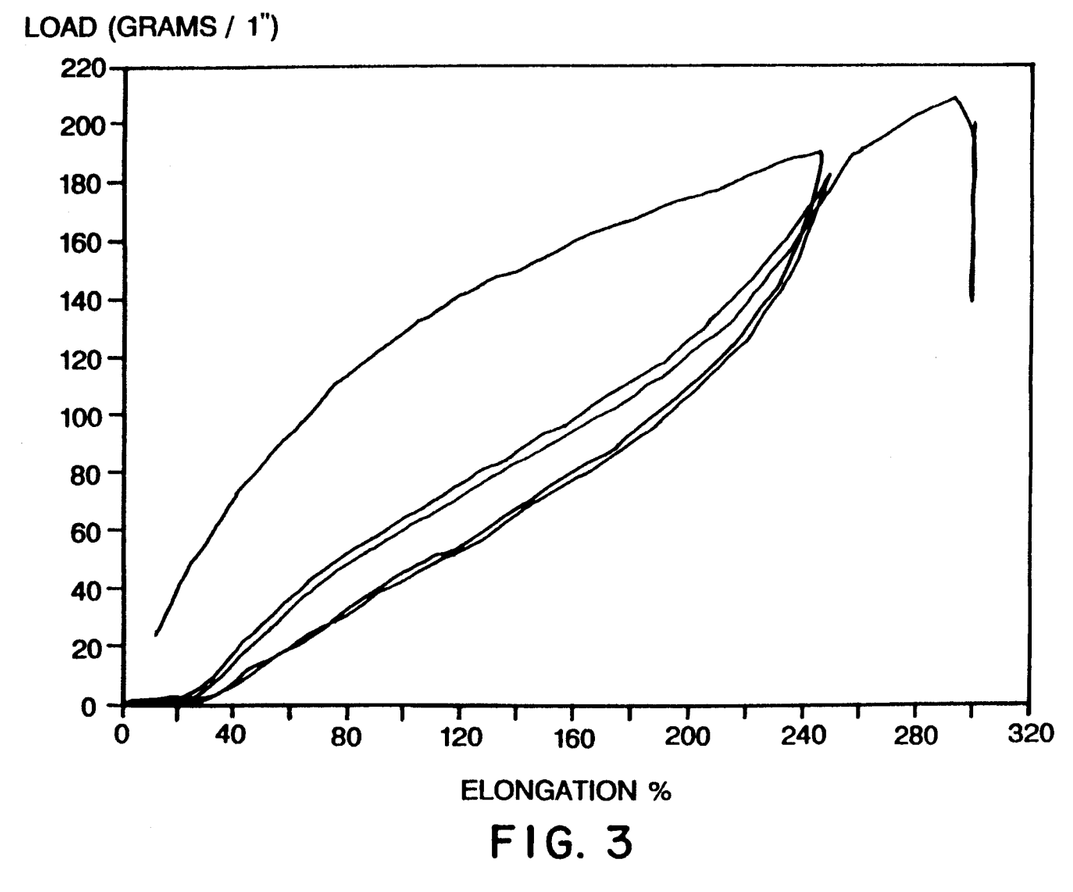
FIG. 3 is an exemplary stress-strain curve for an elastic nonwoven web of meltblown fibers formed from a styrene-poly(ethylene-butylene)-styrene thermoplastic elastomeric block copolymer blend.
Figure 4:
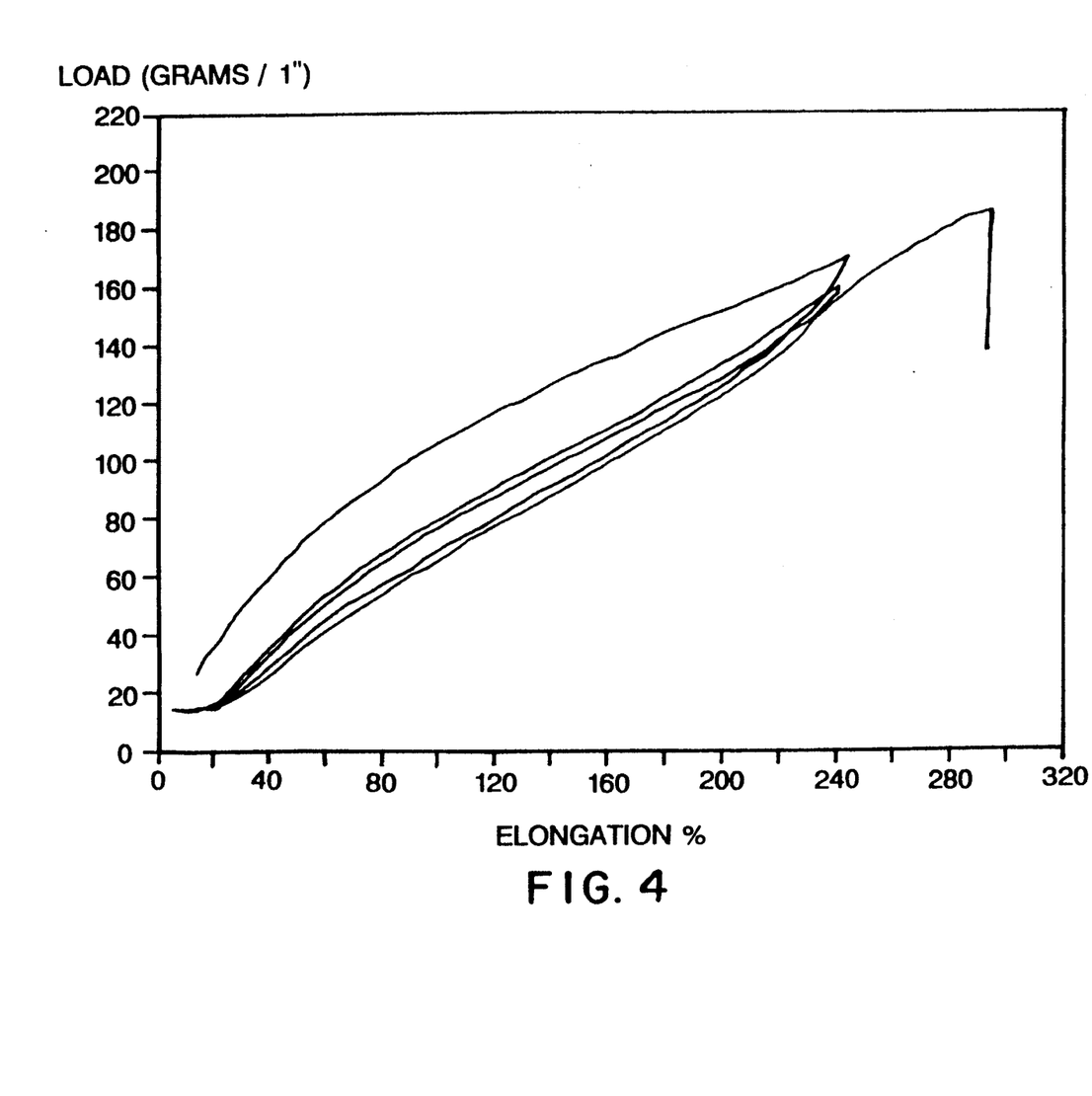
FIG. 4 is an exemplary stress-strain curve for an elastic nonwoven web of meltblown fibers formed from a modified styrene-poly(ethylene-butylene)-styrene thermoplastic elastomeric block copolymer blend.

Elastic nonwoven webs formed from blends containing the recited levels of additives such as, for example, 57.7 percent, by weight, Shell Chemical Co., styrene-poly(ethylene-propylene)-styrene elastomeric block copolymer (molecular weight 62,000) available from the Shell Chemical Company; 18.3 percent, by weight, REGALREZ® 1126 (hydrocarbon tackifying resin); 18.2 percent, by weight, Petrothene NA 601 (polyethylene); and 5.8 percent, by weight, Drakeol 34 (mineral oil) had a flatter stress-strain hysteresis loop and less stress relaxation at 300% elongation than the conventional styrene-poly(ethylene-butylene)-styrene blend as can be seen from FIGS. 2-4.

Specifically, FIG. 2 is an exemplary stress-strain curve for a 53.3 gsm meltblown web formed from the above-described styrene-poly(ethylene-propylene)-styrene elastomeric block copolymer blend. FIG. 3 is an exemplary stress-strain curve for a 64.8 gsm meltblown web formed from a blend of about 63 percent, by weight, styrene-poly(ethylene-butylene)-styrene elastomeric block copolymer (KRATON® G-1657); 17 percent, by weight, REGALREZ® 1126; and 20 percent, by weight, Petrothene NA 601. FIG. 4 is an exemplary stress-strain curve for a 85.6 gsm meltblown web formed from a blend of about 63 percent, by weight, styrene-poly(ethylene-butylene)-styrene elastomeric block copolymer mixture (the mixture being a combination of about 42.2 percent, by weight, KRATON® G-1652 and about 27.3 percent, by weight KRATON® G-1657); about 22.1 percent, by weight, REGALREZ® 1126; about 4.4 percent, by weight, Petrothene NA 601; and about 10.5 percent, by weight, Drakeol 34 oil.

As stated previously, while the extrudable elastomeric composition used to form the elastic sheet has been discussed in terms of a four-component extrudable composition of (1) styrene-poly(ethylene-propylene)-styrene elastomeric polymer or mixture of styrene-poly(ethylene-propylene)-styrene and styrene-poly(ethylene-butylene)-styrene elastomeric block copolymers; (2) polyolefin; (3) tackifying resin; and (4) extending oil; the polyolefin, which functions as a flow promoter for the composition can be substituted by other compatible flow promoters or processing aids, or can be eliminated altogether where the tackifying resin can also act as the flow promoter and/or extending oil. The extending oil, which functions as a processing aid, may also be substituted by other compatible processing aids or can be eliminated altogether where the tackifying resin can also act as the extending oil. For example, low molecular weight hydrocarbon resins such as REGALREZ® tackifier can also act as the viscosity reducer and/or the extending oil, whereby the extrudable composition may contain the elastomeric block copolymer(s) and the tackifying resin (e.g., REGALREZ® tackifier).

While the principal components of the blend have been described in the foregoing, such extrudable composition is not limited thereto, and can include other components not adversely affecting the composition attaining the stated objectives. The blend used to form the elastic nonwoven web may be mixed with other appropriate materials, such as, for example, pigments, antioxidants, stabilizers, surfactants, waxes, flow promoters, solvents, particulates and materials added to enhance processability of the composition prior to or after its introduction into the hopper 12.

Referring again to FIG. 1, the extruder 14 has an extrusion screw (not shown) which is driven by a conventional drive motor (not shown). As the elastic block copolymer advances through the extruder 14, due to rotation of the extrusion screw by the drive motor, it is progressively heated to a molten state. Heating of the elastic block copolymer to the molten state may be accomplished in a plurality of discrete steps with its temperature being gradually elevated as it advances through discrete heating zones of the extruder 14 toward a meltblowing die 16. The die 16 may be yet another heating zone where the temperature of the thermoplastic resin is maintained at an elevated level for extrusion. The temperature which will be required to heat the elastic block copolymer to a molten state will vary somewhat depending upon which grade of elastic block copolymer is utilized and can be readily determined by those in the art. However, generally speaking, the elastic block copolymer may be extruded within the temperature range of from about 450 degrees Fahrenheit to about 550 degrees Fahrenheit. For example, the extrusion may be accomplished within a temperature range of from about 475 degrees Fahrenheit to about 500 degrees Fahrenheit. Heating of the various zones of the extruder 14 and the meltblowing die 16 may be achieved by any of a variety of conventional heating arrangements (not shown).

Figure 5:
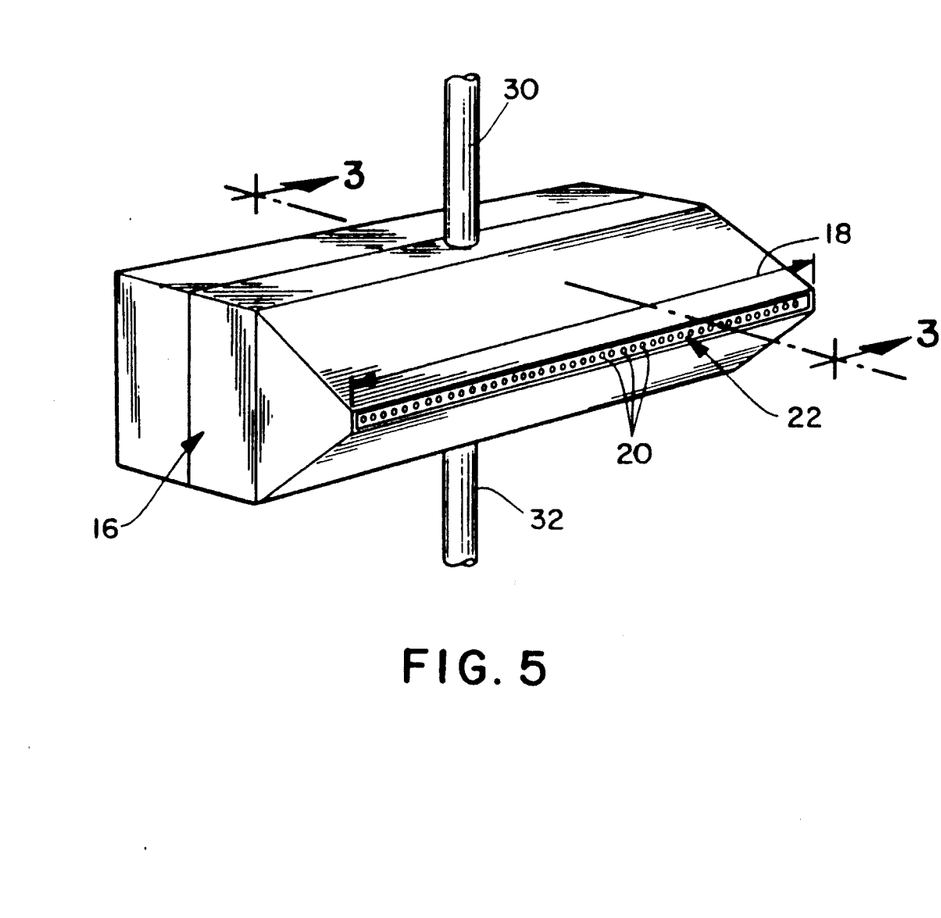
FIG. 5 is a bottom view of the die of FIG. 1 with the die having been rotated 90 degrees for clarity.

FIG. 5 illustrates that the lateral extent 18 of the die 16 is provided with a plurality of orifices 20 which are usually circular in cross-section and are linearly arranged along the extent 18 of the tip 22 of the die 16. The orifices 20 of the die 16 may have diameters that range from about 0.01 of an inch to about 0.02 of an inch and a length which may range from about 0.05 inches to about 0.20 inches. For example, the orifices may have a diameter of about 0.0145 inches and a length of about 0.113 inches. From about 5 to about 50 orifices may be provided per inch of the lateral extent 18 of the tip 22 of the die 16 with the die 16 extending from about 30 inches to about 60 inches or more. FIG. 1 illustrates that the molten elastic block copolymer emerges from the orifices 20 of the die 16 as molten strands or threads 24.

Figure 6:
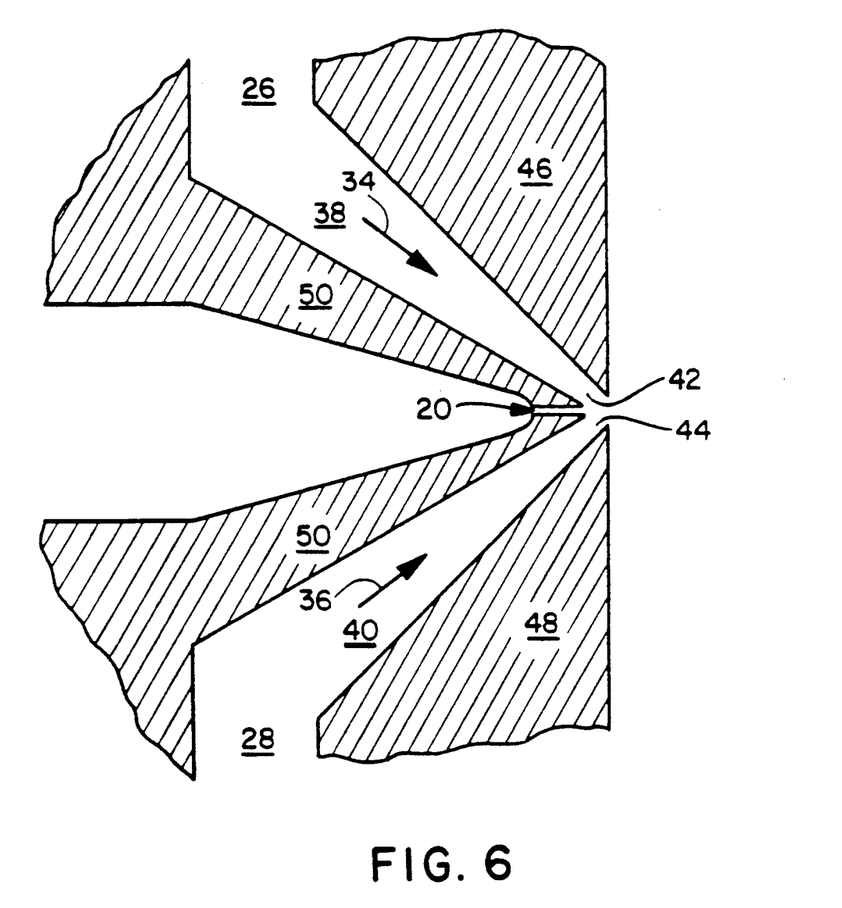
FIG. 6 is a cross-sectional view of the die of FIG. 1 taken along line 3—3 of FIG. 5.

FIG. 6, which is a cross-sectional view of the die of FIG. 5 taken along line 3—3, illustrates that the die 16 preferably includes attenuating gas inlets 26 and 28 which are provided with heated, pressurized attenuating gas (not shown) by attenuating gas sources 30 and 32. (See FIGS. 1 and 5). The heated, pressurized attenuating gas enters the die 16 at the inlets 26 and 28 and follows a path generally designated by the arrows 34 and 36 through the two chambers 38 and 40 and on through the two narrow passageways or gaps 42 and 44 so as to contact the extruded threads 24 as they exit the orifices 20 of the die 16. The chambers 38 and 40 are designed so that the heated attenuating gas passes through the chambers 38 and 40 and exits the gaps 42 and 44 to form a stream (not shown) of attenuating gas which exits the die 16 on both sides of the threads 24. The temperature and pressure of the heated stream of attenuating gas can vary widely. For example, the heated attenuating gas can be applied at a temperature of from about 470 degrees Fahrenheit to about 580 degrees Fahrenheit, more particularly, from about 500 degrees Centigrade to about 550 degrees Centigrade. The heated attenuating gas may generally be applied at a pressure of from about 0.5 pounds per square inch, gauge to about 20 pounds per square inch, gauge. More particularly, from about 1 pound per square inch, gauge to about 5 pounds per square inch, gauge.

The position of air plates 46 and 48 which, in conjunction with a die portion 50 define the chambers 38 and 40 and the gaps 42 and 44, may be adjusted relative to the die portion 50 to increase or decrease the width of the attenuating gas passageways 42 and 44 so that the volume of attenuating gas passing through the air passageways 42 and 44 during a given time period can be varied without varying the velocity of the attenuating gas. Furthermore, the air plates 46 and 48 may be adjusted to effect a "recessed" die-tip configuration as illustrated in FIG. 3 or a positive die-tip 22 stick-out where the tip of die portion 50 protrudes beyond the plane formed by the plates 48. Generally speaking, a positive die-tip stick-out configuration and attenuating gas pressures of less than 5 pounds per square inch, gauge are used in conjunction with air passageway widths, which are usually the same and are no greater in width than about 0.110 inches. Lower attenuating gas velocities and wider air passageway gaps are generally preferred if substantially continuous meltblown fibers or microfibers 24 are to be produced.

The two streams of attenuating gas converge to form a stream of gas which entrains and attenuates the molten threads 24, as they exit the orifices 20, into fibers or, depending upon the degree of attenuation, microfibers, of a small diameter which is usually less than the diameter of the orifices 20. The gas-borne fibers or microfibers 24 are blown, by the action of the attenuating gas, onto a collecting arrangement which, in the embodiment illustrated in FIG. 1, is a foraminous endless belt 52 conventionally driven by rollers 54. Other foraminous arrangements such as a rotating drum could be utilized. One or more vacuum boxes (not illustrated) may be located below the surface of the foraminous belt 52 and between the rollers 54. The fibers or microfibers 24 are collected as a coherent matrix of fibers on the surface of the endless belt 52 which is rotating as indicated by the arrow 58 in FIG. 1. The vacuum boxes assist in retention of the matrix on the surface of the belt 52. Typically the tip 22 of the die 16 is from about 6 inches to about 14 inches from the surface of the foraminous belt 52 upon which the fibers are collected. The thus-collected, entangled fibers or microfibers 24 are coherent and may be removed from the belt 52 as a self-supporting nonwoven web 56 by a pair of pinch rollers 60 and 62 which may be designed to press the fibers of the web 56 together to improve the integrity of the web 56.

The above-described meltblowing techniques, and apparatus are discussed fully in U.S. Pat. No. 4,663,220, the contents of which have been previously incorporated herein by reference. For example, a blend containing, by weight, 57.7, percent styrene-poly(ethylene-propylene)styrene block copolymer (molecular weight 62,000) available from the Shell Chemical Company; 18.3 percent Petrothene NA 601 polyethylene; 18.2 percent REGALREZ®1126; and 5.8 percent Drakeol 34 was meltblown with the blend heated to a temperature of 480° F. Generally, and intended to be illustrative and not limiting, the following described parameters can be used for meltblowing the polymer blends to form the elastic nonwoven webs of the present invention. Thus, the blends can be meltblown while at a temperature of 450° to 550° F., preferably 475° to 500° F., during the meltblowing. The primary air temperature, during the meltblowing, can be 475° to 525° F., preferably 500° to 520° F.; and the primary air pressure can be 1.5-8 pounds per square inch (psi) gauge, preferably 2-4 psi gauge.

In some situations, nonwoven webs of elastic fibers formed from blends that contain the previously described mixtures of a styrene-poly(ethylene-propylene)-styrene elastomeric block copolymer and another elastomeric block copolymer such as, for example, styrene-poly(ethylene-butylene)-styrene elastomeric block copolymers may have a measured stress relaxation which is greater than 30 percent. This has been observed for relatively low basis weight webs (e.g., basis weights less than about 55 grams per 1"×6" area) formed from certain formulations containing a mixture of styrene-poly(ethylene-propylene)-styrene and styrene-poly(ethylene-butylene)-styrene elastomeric block copolymers (See Example 6 and Table 6). Although the invention should not be held to a particular theory of operation, it is believed that the high level of stress relaxation results from the movement of individual fibers in the loosely coherent fibrous structure of the nonwoven web. Such fiber movement may be reduced by using higher basis weight nonwoven webs which typically have a more coherent fibrous structure. Fiber entangling may also be used to decrease the fiber movement. Fiber entangling is inherent in nonwoven web formation processes (e.g., meltblowing processes) but may be generated or increased by processes such as, for example, hydraulic entangling or needlepunching. Alternatively and/or additionally, thermal bonding or a bonding agent can be utilized to decrease the fiber movement and increase the structural coherency of the web. For example, powdered bonding agents and chemical solvent bonding may be used. Additionally, it is believed formulations containing a mixture of styrene-poly(ethylene-propylene)-styrene and styrene-poly(ethylene-butylene)-styrene elastomeric block copolymers may be modified to reduce the level of stress relaxation by reducing the amount of certain processing aids that are believed to contribute to stress relaxation. For example, it is believed that the stress relaxation of the nonwoven webs prepared according to Example 6 may be reduced to less than 30 percent by reducing or eliminating the extending oil in the formulation in order to improve the structural coherence of the nonwoven web.

Figure 7:
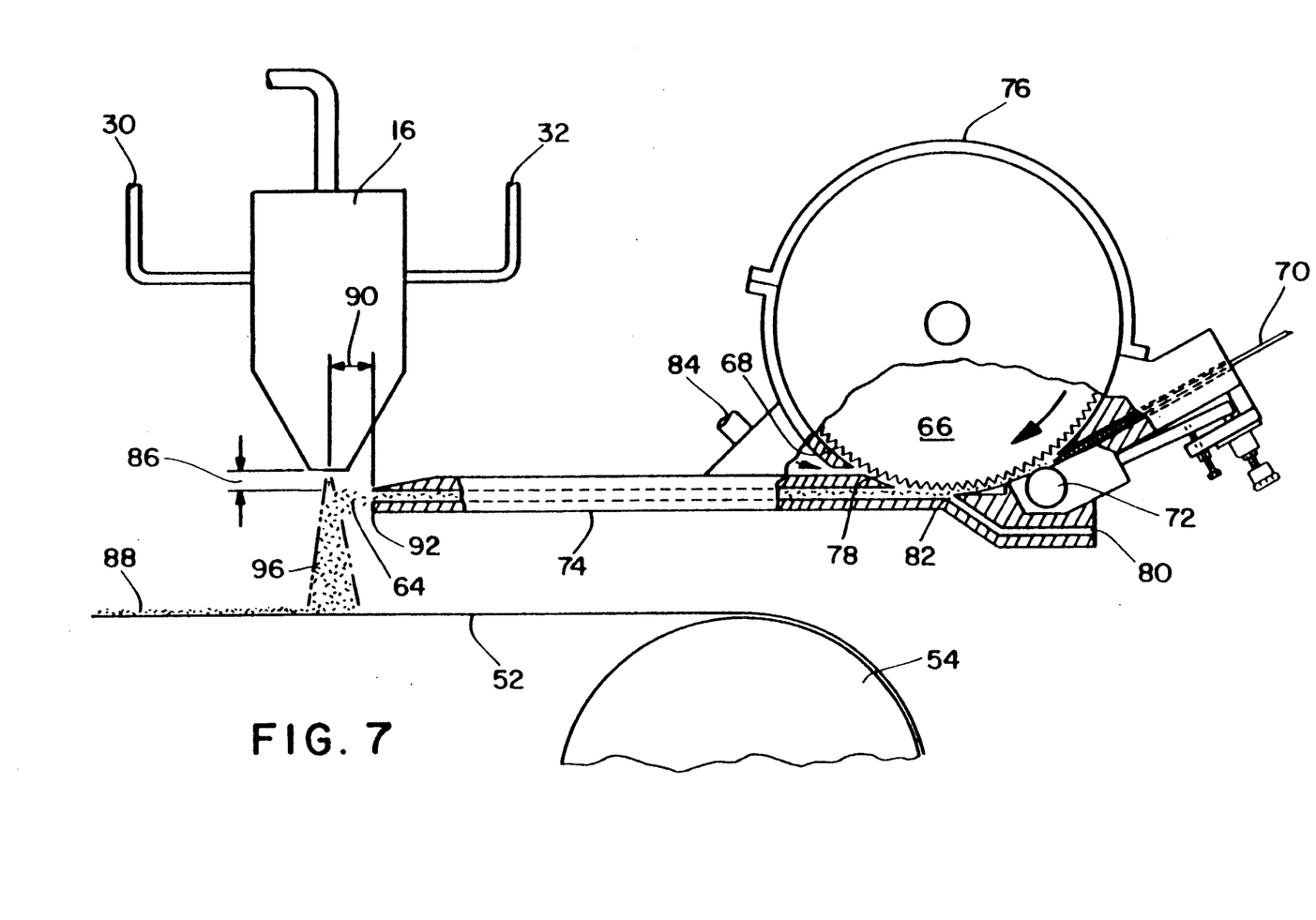
FIG. 7 is a schematic illustration of an apparatus which may be utilized to form the embodiment of the present invention where nonelastic fibers are incorporated into the matrix of meltblown fibers.

FIG. 7 illustrates another embodiment of the present invention where one or more types of nonelastic fibers 64 are distributed within or upon the stream of thermoplastic fibers or microfibers 24. Distribution of the nonelastic fibers 64 within the stream of fibers 24 may be such that the nonelastic fibers 64 are generally uniformly distributed throughout the stream of elastic block copolymer fibers 24. This may be accomplished by merging a secondary gas stream (not shown) containing the nonelastic fibers 64 with the stream of fibers 24. Apparatus for accomplishing this merger may include a conventional picker roll 66 arrangement which has a plurality of teeth 68 that are adapted to separate a mat or batt 70 of nonelastic fibers into the individual nonelastic fibers 64. The mat or batt of fibers 70 which is fed to the picker roll 66 may be a sheet of pulp fibers (if a two component mixture of elastomeric block copolymer fibers and pulp fibers is desired), a mat of staple fibers (if a two component mixture of elastomeric block copolymer fibers and staple fibers is desired) or both a sheet of pulp fibers and a mat of staple fibers (if a three component mixture of elastomeric block copolymer fibers, staple fibers and pulp fibers is desired). In embodiments where, for example, an absorbent material is desired, the nonelastic fibers 64 are absorbent fibers. The nonelastic fibers 64 may generally be selected from the group including one or more polyester fibers, polyamide fibers, polyolefin fibers such as, for example, polyethylene fibers and polypropylene fibers, cellulosic derived fibers such as, for example, rayon fibers and wood pulp fibers, multi-component fibers such as, for example, sheath-core multi-component fibers or side-by-side multi-component fibers, natural fibers such as silk fibers, wool fibers or cotton fibers or electrically conductive fibers or blends of two or more of such fibers. Other types of nonelastic fibers 64 as well as blends of two or more of other types of fibers 64 may be utilized. The nonelastic fibers 64 may be microfibers or the nonelastic fibers 64 may be macrofibers having an average diameter of from about 300 microns to about 1,000 microns.

The sheets or mats 70 of nonelastic fibers 64 are fed to the picker roll 66 by a roller arrangement 72. After the teeth 68 of the picker roll 66 have separated the mat of nonelastic fibers 70 into separate nonelastic fibers 64 the individual nonelastic fibers 64 are conveyed toward the stream of elastic block copolymer fibers or microfibers 24 through a nozzle 74. A housing 76 encloses the picker roll 66 and provides a passageway or gap 78 between the housing 76 and the surface of the teeth 68 of the picker roll 66. A gas (not shown), for example air, is supplied to the passageway or gap 78 between the surface of the picker roll 66 and the housing 76 by way of a gas duct 80. The gas duct 80 may enter the passageway or gap 78 generally at the junction 82 of the nozzle 74 and the gap 78. The gas is supplied in sufficient quantity to serve as a medium for conveying the nonelastic fibers 64 through the nozzle 74. The gas supplied from the duct 80 also serves as an aid in removing the nonelastic fibers 64 from the teeth 68 of the picker roll 66. However, gas supplied through the duct 84 generally provides for the removal of the nonelastic fibers 64 from the teeth of the picker roll 66. The gas may be supplied by any conventional arrangement such as, for example, an air blower (not shown).

Generally speaking, the individual nonelastic fibers 64 are conveyed through the nozzle 74 at generally the velocity at which the nonelastic fibers 64 leave the teeth 68 of the picker roll 66. In other words, the nonelastic fibers 64, upon leaving the teeth 68 of the picker roll 66 and entering the nozzle 74, generally maintain their velocity in both magnitude and direction from the point where they left the teeth 68 of the picker roll 66. Such an arrangement, which is discussed in more detail in U.S. Pat. No. 4,100,324 to Anderson et al., hereby incorporated by reference, aids in substantially reducing fiber floccing.

As an aid in maintaining satisfactory nonelastic fiber 64 velocity, the nozzle 74 may be positioned so that its longitudinal axis is substantially parallel to a plane which is tangent to the picker roll 66 at the junction 82 of the nozzle 74 with the passageway 78. As a result of this configuration, the velocity of the nonelastic fibers 64 is not substantially changed by contact of the nonelastic fibers 64 with the walls of the nozzle 74. If the nonelastic fibers 64 temporarily remain in contact with the teeth 68 of the picker roll 66 after they have been separated from the mat or batt 70, the axis of the nozzle 74 may be adjusted appropriately to be aligned with the direction of nonelastic fiber 64 velocity at the point where the nonelastic fibers 64 disengage from the teeth 68 of the picker roll 66. The disengagement of the nonelastic fibers 64 from the teeth 68 of the picker roll 66 may be assisted by application of a pressurized gas, i.e., air through duct 84.

The vertical distance 86 that the nozzle 74 is below the die tip 22 may be adjusted to vary the properties of the composite web 88. Variation of the horizontal distance 90 of the tip 92 of the nozzle 74 from the die tip 22 will also achieve variations in the final elastic nonwoven web 88. The vertical distance 86 and the horizontal distance 90 values will also vary with the material being added to the elastomeric block copolymer fibers 24. The width of the nozzle 74 along the picker roll 66 and the length that the nozzle 74 extends from the picker roll 66 are also important in obtaining optimum distribution of the nonelastic fibers 64 throughout the stream of fibers 24. It is usually desirable for the length of the nozzle 74 to be as short as equipment design will allow. The length is usually limited to a minimum length which is generally equal to the radius of the picker roll 66. Usually, the width of the nozzle 74 should not exceed the width of the sheets or mats 70 that are being fed to the picker roll 66.

The picker roll 66 may be replaced by a conventional particulate injection system to form a composite nonwoven web 88 containing various particulates. A combination of both particulates and nonelastic fibers could be added to the elastic block copolymer fibers prior to formation of the composite nonwoven web 88 if a conventional particulate injection system was added to the system illustrated in FIG. 7. FIG. 4 further illustrates that the gas stream carrying the nonelastic fibers 64 is moving in a direction which is generally perpendicular to the direction of movement of the stream of elastic block copolymer fibers 24 at the point of merger of the two streams. Other angles of merger of the two streams may be utilized. The velocity of the gas stream of nonelastic fibers 64 is usually adjusted so that it is less than the velocity of the stream of elastomeric block copolymer fibers 24. This allows the streams, upon merger and integration thereof to flow in substantially the same direction as that of the stream of elastomeric block copolymer fibers 24. Indeed, the merger of the two streams may be accomplished in a manner which is somewhat like an aspirating effect where the stream of nonelastic fibers 64 is drawn into the stream of elastomeric block copolymer fibers 24. If desired the velocity difference between the two gas streams may be such that the nonelastic fibers 64 are integrated into the elastomeric block copolymer fibers 24 in a turbulent manner so that the nonelastic fibers 64 become substantially thoroughly and uniformly mixed throughout the elastomeric block copolymer fibers 24. Generally, for increased production rates the gas stream which entrains and attenuates the stream of elastomeric block copolymer fibers 24 should have a comparatively high initial velocity, for example from about 200 feet to over 1,000 feet per second, and the stream of gas which carries the nonelastic fibers 64 should have a comparatively low initial velocity, for example from about 50 to about 200 feet per second. After the stream of gas that entrains and attenuates the elastomeric block copolymer fibers 24 exits the gaps 42 and 44 of the die 16, it immediately expands and decreases in velocity.

Upon merger and integration of the stream of nonelastic fibers 64 into the stream of elastomeric block copolymer fibers 24 to generally uniformly distribute the nonelastic fibers 64 throughout the stream of elastomeric block copolymer fibers 24, a composite stream 96 of thermoplastic fibers 22 and nonelastic fibers 64 is formed. Due to the fact that the elastomeric block copolymer fibers 24 are usually still semi-molten and tacky at the time of incorporation of the nonelastic fibers 64 into the elastomeric block copolymer fibers 24, the nonelastic fibers 64 are usually not only mechanically entangled within the matrix formed by the elastomeric block copolymer fibers 24 but are also thermally bonded or joined to the elastomeric block copolymer fibers 24. In order to convert the composite stream 96 of elastomeric block copolymer fibers 24 and nonelastic fibers 64 into a composite elastic nonwoven web or mat 88 composed of a coherent matrix of the elastomeric block copolymer fibers 24 having the nonelastic fibers 64 generally uniformly distributed therein, a collecting device is located in the path of the composite stream 96. The collecting device may be the endless belt 52 of FIG. 7 upon which the composite stream 96 impacts to form the composite nonwoven web 56. The belt 52 is usually porous and a conventional vacuum arrangement (not shown) which assists in retaining the composite stream 96 on the external surface of the belt 52 is usually present. Other collecting devices are well known to those of skill in the art and may be utilized in place of the endless belt 52. For example, a porous rotating drum arrangement could be utilized. Thereafter, the composite elastic nonwoven web 88 is removed from the screen by the action of rollers such as roller 60 and 62 shown in FIG. 1.

EXAMPLE I

A fibrous nonwoven elastic web was formed by meltblowing a blend of approximately 57.7 percent, by weight, styrene-poly(ethylene-propylene)-styrene elastic block copolymer (molecular weight 62,000) obtained from the Shell Chemical Company, 18.3 percent, by weight, Petrothene NA 601 (polyethylene), 18.2 percent, by weight, REGALREZ ®1126 tackifying resin, and 5.8 percent, by weight, Drakeol 34 mineral oil. The blend had a melt flow rate of 11.5 grams per 10 minutes. The melt flow rate of the blend was determined in accordance with ASTM D1238 at 190° C. under a 2160 gram load over a 10 minute period.

Meltblowing of the blend was accomplished by extruding the blend through a meltblowing die having 30 extrusion capillaries per lineal inch of die tip. The capillaries each had a diameter of about (0.0145 inches) and a length of about (0.113 inches). The elastic blend was passed through the capillaries at a rate of about 0.1513 grams per capillary per minute at a temperature of about 480 degrees Fahrenheit. The extrusion pressure exerted upon the molten blend in the die tip was measured as 254 pounds per square inch, gauge. The die tip configuration was adjusted so that it had a positive die tip stickout of about (0.010) inches from the plane of the external surface of the lips of the air plates which form the air passageways on either side of the capillaries. The air plates were adjusted so that the two air passageways, one on each side of the extrusion capillaries, formed air passageways of a width or gap of about (0.067 inches). Forming air for meltblowing the blend was supplied to the air passageways at a temperature of about 503 degrees Fahrenheit and at a pressure of about 1.9 pounds per square inch, gauge. The meltblown fibers thus formed were blown onto a forming screen which was approximately 14 inches from the die tip. The meltblown fibers were collected on the forming screen into coherent nonwoven webs having basis weights of approximately 80 grams per square meter (gsm), 65 gsm, and 50 gsm.

Examples 2–6 were conducted in accordance with Example 1. Extrudable blends for those examples were prepared by blending varying amounts of a styrene-poly(ethylene-propylene)-styrene elastomeric block copolymer (molecular weight 62,000) available from the Shell Chemical Company, a polyolefin (Petrothane NA 601 polyethylene), a tackifying resin (REGALREZ ® 1126 hydrocarbon resin), and an extending oil (Drakeol 34 white mineral oil). In Example 3, the styrene-poly(ethylene-propylene)-styrene elastomeric block copolymer is the same as that described above except that the average molecular weight ratio of polystyrene endblocks to poly(ethylene-propylene) midblocks is about 25:75. In Example 6, the styrene-poly(ethylene-propylene)-styrene elastomeric block copolymer was combined with a styrene-poly(ethylene-butylene)-styrene elastomeric block copolymer available from the Shell Chemical Company under the trade designation KRATON ® G-1652 to form an elastomeric block copolymer mixture. The amount of each component is expressed in weight percent in Table 4 for each extrudable elastomeric composition. Additives which are present only in small amounts such as, for example, antioxidant are not shown in the formulations of Table 4.

TABLE 4

| | Example | | | | |
|---|---|---|---|---|---|
| | 2 | 3 | 4 | 5 | 6 |
| Styrene-poly(ethylene-propylene)-styrene block copolymer | 61.9 | 61.9[1] | 61.9 | 57.7 | 23.3 |
| KRATON ® G-1652 | 0 | 0 | 0 | 0 | 35.0 |
| polyolefin | 8.7 | 8.7 | 8.7 | 18.3 | 14.0 |
| tackifying resin | 19.5 | 19.5 | 19.5 | 18.2 | 18.4 |
| extending oil | 9.9 | 9.9 | 9.9 | 5.8 | 9.3 |

[1] Average molecular weight ratio of polystyrene endblocks to poly(ethylene-propylene) midblocks for this SEPS elastomeric block copolymer is about 25:75.

All of the meltblown webs were prepared using a meltblowing die which had 30 extrusion capillaries per lineal inch of die tip. The capillaries of the meltblowing die each had a diameter of about (0.0145 inches) and a length of about (0.113 inches). The various process parameters of Examples 2-6 are detailed in Table 5.

TABLE 5

| | Example | | | | |
|---|---|---|---|---|---|
| | 2 | 3 | 4 | 5 | 6 |
| Melt Flow Rate[1] | 21 | 75 | 18.0 | 12.0 | 11.4 |
| Extrusion Rate[2] | 0.756 | 0.756 | 0.378 | 0.353 | 0.504 |
| Extrusion Die | 481 | 481 | 476 | 476 | 477 |
| Temperature[3] | | | | | |
| Extrusion Die Pressure[4] | 357 | 210 | 295 | 254 | 300 |
| Die Tip Stick-Out[5] | 0.010 | 0.010 | 0.010 | −0.148 | −0.148 |
| Air Passageway Gap[6] | 0.067 | 0.067 | 0.067 | 0.067 | 0.067 |
| Air Temperature[7] | 512 | 511 | 527 | 503 | 498 |
| Air Pressure[8] | 1.9 | 1.9 | 1.9 | 1.9 | 1.9 |
| Distance Die-Tip to Forming Screen[9] | 10 | 10 | 10 | 14 | 14 |

[1] = in grams per 10 minutes
[2] = in grams per capillary per minute
[3] = in degrees Fahrenheit
[4] = in pounds per square inch, gauge in the die tip cavity
[5] = in inches (negative values indicate recessed die tip arrangement)
[6] = in inches
[7] = in degrees Fahrenheit
[8] = in pounds per square inch, gauge
[9] = in inches

TENSILE TEST AND CYCLING DATA

The meltblown webs produced in Examples 1-5 were tested to determine the tensile properties of those materials. The results of the tests are reported in Table 6. The meltblown webs were tested on a Constant Rate of Extension Tester, Instron Model 1122 Universal Testing Instrument. Samples were cut to 1" width by 6" length, with the 6" dimension in the direction of stretch measurement. Three (3) samples were cut for each fabric direction (i.e., machine direction and cross machine direction). Each sample was placed lengthwise in jaw faces, 3" wide × 1" length, with a jaw span or separation of 4 inches. The Instron crosshead speed was set at 20 inches per minute. Measurements were taken of the load at 100% elongation (i.e., 200% of the material's initial length) and 250% elongation (i.e., 350% of the material's initial length) during the load portion of the first cycle and the load at 100% elongation during the unload portion of the cycle. The measurements were repeated at 100% elongation and 250% elongation during the load portion of the second cycle and at 100% elongation during the unload portion of the second cycle. The sample was then extended to 300% elongation (i.e., 400% of the material's initial length) at 20 inches per minute and the load was measured (a) upon reaching 300% elongation, (b) after being held at 300% elongation for 1 minute and (c) after being held at 300% elongation for 20 minutes. The difference between the initial load measured after 300% elongation and the load measured at 300% elongation for 20 minutes was determined.

TABLE 6

| Example | 1' × 6'[2] Basis Weight | Load[1] @100% Extension | Load @250% Extension | Unload @100% Extension | Load @100% 2nd Cycle | Load @250% 2nd Cycle | Unload @100% 2nd Cycle | Load @300% Ext. T = 0 | Load @300% Ext. T = 1 Min. | Load @300% Ext. T = 20 Min. | % Diff. 0–20 Min. | 2nd Cycle Unloaded @100% Ext. Divided by MBBW[2] |
|---|---|---|---|---|---|---|---|---|---|---|---|---|
| 2 | 60.4 | 74.9 | 132.7 | 44.0 | 51.0 | 123.6 | 49.8 | 152.2 | 149.4 | 118.7 | 22 | 0.82 |
| 2 | 84.5 | 125.9 | 218.4 | 79.8 | 91.6 | 207.5 | 73.5 | 249.1 | 245.3 | 196.3 | 21 | 0.93 |
| 3 | 72.1 | 105.3 | 182.8 | 59.4 | 69.8 | 167.8 | 56.4 | 204.4 | 200.3 | 144.2 | 29 | 0.78 |
| 4 | 87.3 | 110.0 | 187.8 | 78.0 | 85.5 | 180 | 78.8 | 215.6 | 213.4 | 173.4 | 20 | 0.90 |
| 5 | 51.6 | 74.2 | 124.6 | 34.9 | 43.4 | 115 | 35.3 | 140.7 | 135 | 99.4 | 29 | 0.68 |
| 5 | 61.1 | 95.9 | 160.0 | 46.8 | 55.5 | 146.3 | 45.1 | 176.2 | 173.4 | 128.0 | 27 | 0.74 |
| 5 | 69.7 | 115.9 | 189.7 | 54.1 | 67.3 | 182.2 | 54.4 | 207.8 | 205 | 152.2 | 27 | 0.78 |
| 5 | 89.9 | 135.2 | 217.7 | 60.2 | 75.5 | 206.2 | 61.6 | 240.3 | 232.5 | 172.5 | 28 | 0.68 |
| 6 | 49.0 | 53.4 | 94.6 | 24.8 | 29.9 | 85.5 | 23.4 | 103.75 | 100.5 | 60.4 | 42 | 0.48 |
| 6 | 54.1 | 71.2 | 118.2 | 33.1 | 41.7 | 109.4 | 33.4 | 130.6 | 126.1 | 84.7 | 35 | 0.62 |

[1] grams
[2] Meltblown Basis Weight gsm (grams per square meter)

RELATED APPLICATIONS

This application is one of a group of patent applications which are being filed on the same date. The group includes the present application and application Ser. No. U.S. Pat. No. 5,169,706 in the name of L. W. Collier, IV, et al., and entitled "Low Stress Relaxation Composite Elastic Material". The subject matter of that patent application is hereby incorporated by reference.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. Elastic fibers formed from an extrudable blend, the blend including:
   (A) an elastomeric polymer selected from the group consisting of styrene-poly(ethylene-propylene)-styrene elastomeric block copolymer and a mixture of styrene-poly(ethylene-polypropylene)-styrene and styrene-poly(ethylene-butylene)-styrene elastomeric block copolymers; and (B) a tackifying resin, wherein the fibers are adapted to form a nonwoven elastic web having a stress relaxation of less than about 30 percent.

2. The elastic fibers of claim 1, wherein said styrene-poly(ethylene-propylene)-styrene elastomeric block copolymer has the formula:

wherein m is an integer from about 38 to 337; and n is an integer from about 500 to 1,860; and R is a benzyl group.

3. The elastic fibers of claim 2, wherein the styrene-poly(ethylene-propylene)-styrene block copolymer has an average molecular weight ratio of polystyrene endblocks to poly(ethylene-propylene) midblocks ranging from about 10:90 to about 25:75.

4. The elastic fibers of claim 1 wherein the mixture of styrene-poly(ethylene-polypropylene)-styrene and styrene-poly(ethylene-butylene)-styrene elastomeric block copolymers contains at least about 40 parts by weight styrene-poly(ethylene-polypropylene)-styrene elastomeric block copolymer per 100 parts of elastomeric block copolymer.

5. The elastic fibers of claim 1, wherein the tackifying resin is selected from the group including hydrogenated hydrocarbon resins and terpene hydrocarbon resins.

6. The elastic fibers of claim 1, wherein the blend further includes a polyolefin.

7. The elastic fibers of claim 6, wherein the polyolefin is selected from the group including polyethylene, polypropylene, polybutylene, polyethylene copolymers, polypropylene copolymers, polybutylene copolymers and mixtures thereof.

8. The elastic fibers of claim 6, wherein the blend further includes an extending oil.

9. The elastic fibers of claim 8, wherein the extending oil is a mineral oil.

10. The elastic fibers of claim 1, wherein said blend comprises from about 50 to about 80 percent, by weight, of an elastomeric polymer, from about 15 to about 28 percent, by weight, of a tackifying resin, from about 3 to about 23 percent, by weight, of a polyolefin, and from about 0 to about 15 percent, by weight, of an extending oil.

11. The elastic fibers of claim 1, wherein the fibers are meltblown fibers.

12. The elastic fibers of claim 11, wherein the meltblown fibers include microfibers.

13. Elastic fibers formed from an extrudable blend, the blend consisting essentially of:

(A) an elastomeric polymer selected from the group consisting of styrene-poly(ethylene-propylene)-styrene elastomeric block copolymer and a mixture of styrene-poly(ethylene-polypropylene)-styrene and styrene-poly(ethylene-butylene)-styrene elastomeric block copolymers;

(B) a polyolefin;

(C) a tackifying resin; and (D) an extending oil, and wherein said fibers are adapted to form a nonwoven elastic web having a stress relaxation of less than about 30 percent.

14. Elastic fibers formed from an extrudable blend, the blend comprising:

(A) from about 50 to about 80 percent, by weight, of an elastomeric polymer selected from the group consisting of styrene-poly(ethylene-propylene)-styrene elastomeric block copolymer and a mixture of styrene-poly(ethylene-polypropylene)-styrene and styrene-poly(ethylene-butylene)-styrene elastomeric block copolymers;

(B) from about 3 to about 23 percent, by weight, of a polyolefin;

(C) from about 15 to about 28 percent, by weight, of a tackifying resin; and (D) from about 0 to about 15 percent, by weight, of an extending oil, and wherein said fibers are adapted to form a nonwoven elastic web having a stress relaxation of less than about 30 percent.

15. The elastic fibers of claim 14, wherein the tackifying resin is selected from the group including hydrogenated hydrocarbon resins and terpene hydrocarbon resins.

16. The elastic fibers of claim 14, wherein the polyolefin is selected from the group including polyethylene, polypropylene, polybutylene, polyethylene copolymers, polypropylene copolymers, polybutylene copolymers and mixtures thereof.

17. The elastic fibers of claim 14, wherein the extending oil is a mineral oil.

* * * * *